United States Patent
Swinford (10) Patent No.: US 9,438,864 B2
(45) Date of Patent: Sep. 6, 2016

(54) INDOOR PRODUCING OF HIGH-RESOLUTION IMAGES OF THE COMMONLY VIEWED EXTERIOR SURFACES OF VEHICLES, EACH WITH THE SAME BACKGROUND VIEW

(71) Applicant: Stephen Michael Swinford, Magnolia, TX (US)

(72) Inventor: Stephen Michael Swinford, Magnolia, TX (US)

(*) Notice: Subject to any disclaimer, the term of this patent is extended or adjusted under 35 U.S.C. 154(b) by 200 days.

(21) Appl. No.: 14/478,681

(22) Filed: Sep. 5, 2014

(65) Prior Publication Data

US 2015/0077564 A1 Mar. 19, 2015

Related U.S. Application Data

(63) Continuation of application No. 13/044,215, filed on Mar. 9, 2011, now Pat. No. 8,830,320.

(60) Provisional application No. 61/311,875, filed on Mar. 9, 2010, provisional application No. 62/018,710, filed on Jun. 30, 2014.

(51) Int. Cl.
*H04N 7/18* (2006.01)
*G03B 15/07* (2006.01)
*G03B 17/56* (2006.01)

(52) U.S. Cl.
CPC ............... *H04N 7/18* (2013.01); *G03B 15/07* (2013.01); *G03B 17/561* (2013.01)

(58) Field of Classification Search
CPC ....... H04N 7/18; G03B 15/07; G03B 17/561
USPC .......................................................... 348/148
See application file for complete search history.

(56) References Cited

U.S. PATENT DOCUMENTS

| | | | | |
|---|---|---|---|---|
| 4,236,795 A * | 12/1980 | Kephart | ................. | G03B 15/06 396/3 |
| 5,726,705 A * | 3/1998 | Imanishi | ............ | G01N 21/8806 348/92 |
| 2004/0183803 A1* | 9/2004 | Longo | ................. | H04N 5/2259 345/473 |
| 2007/0114345 A1* | 5/2007 | Lee | ........................ | F16M 11/42 248/166 |

* cited by examiner

*Primary Examiner* — Allen Wong
(74) *Attorney, Agent, or Firm* — Eric P. Mirabel (57) ABSTRACT

Disclosed is an apparatus and a process for producing and viewing through the internet high-resolution images of the commonly viewed exterior surfaces of a vehicle, while maintaining the same background view for multiple images of the vehicle. The background and the imaging device are revolved around a vehicle which is maintained in fixed position between the background and the imaging device. There can be two or more opposed imaging devices and two or more opposed displays. The vehicle does not need to be rotated or moved during the imaging.

21 Claims, 13 Drawing Sheets

INDOOR PRODUCING OF HIGH-RESOLUTION IMAGES OF THE COMMONLY VIEWED EXTERIOR SURFACES OF VEHICLES, EACH WITH THE SAME BACKGROUND VIEW

RELATED APPLICATION

The present application is a CIP of and claims priority to U.S. application Ser. No. 13/044,215, filed Mar. 9, 2011, which claims priority to U.S. provisional patent application No. 61/311875, filed Mar. 9, 2010.

FIELD OF THE INVENTION

The invention relates to production and viewing, through the Internet and without image downloading or high bandwidth requirements, of high-resolution images of the commonly viewed exterior surfaces of a vehicle, while maintaining the same background view for multiple images of the vehicle.

BACKGROUND

In the used car market, views of the exterior of the car (but not usually the underside) are typically required by and provided to the buyer before consummating a transaction. High resolution images showing small flaws and damage to the vehicle are preferred. One method of making these images is to rotate the vehicle on a turntable and create a series of images against a consistent background. The images can be displayed and viewed in a manner to generate a virtual 360 degree tour of the vehicle.

The two problems with this approach are that a turntable for a vehicle is a heavy, expensive and complex piece of equipment, and that high resolution images require long delays to download—or cannot be downloaded and viewed by a potential vehicle purchaser without considerable bandwidth. An additional problem is that the uppermost side of a vehicle is often not shown unless a robot for moving the imaging device is used. See FSI Viewer (Neptunelabs Gmbh). These known methods are expensive and have serious disadvantages for performing the imaging of a vehicle.

SUMMARY

In a first aspect, the invention is a process of producing and viewing through the internet high-resolution images of the commonly viewed exterior surfaces of a vehicle, while maintaining the same background view for the images. The images are stored on a server accessible through the internet, and can be selectively zoomed and viewed through the internet, so that less bandwidth is required than if the entirety of all the high-resolution images was accessible for each isolated view through the internet.

This process involves producing multiple images of a vehicle (still frame or video) by revolution of both an imaging device and a display around a vehicle which is in a fixed position between them, such that as the imaging device captures multiple images of the vehicle, the display is also captured in each of said images. The images are sufficiently pixilated such that even minor damage to the vehicle exterior surface can be viewed by zooming in when the images are displayed. Normal views of the images may not allow viewing of minor damage, so as to avoid requirements for large data streams. The images are uploaded to a server and can be viewed remotely through the internet, without downloading of the images.

Another aspect of the invention is an apparatus for producing images of the commonly viewed exterior surfaces of a vehicle, while maintaining the same background view for multiple images of the vehicle. The apparatus includes an imaging device (producing still frame or video) and a display wherein the imaging device can be revolved around a vehicle which is in a fixed position between them. The imaging device and the display revolve around the vehicle in the same direction and at the same rate such that as the imaging device captures multiple images of the vehicle, the display is captured in each of said multiple images. The imaging device and the display are preferably wheeled and can be linked to ensure coordinated revolution, or otherwise timed to coordinate their movement and maintain their relative positions.

The degree of arc followed by the display and the imaging device can be adjustable—for example, by using wheels which rotate on a vertical axis to control direction—or by using fixed wheels set to generate a particular arc for the display and the dolly or carrier rack which transport the imaging device. The display and the dolly or carrier rack themselves can also be arced like the chassis on which they rest, and can be composed of multiple sections, for easy transport. The dolly or carrier rack for the imaging device can also carry other components including lighting (projecting towards the vehicle), a computer (to upload images), a seat for an operator, a drive motor to power the revolution, a power source, an adjustable holder for the imaging device (which may extend upwardly to allow capturing images of the uppermost side of the vehicle), and other components, e.g., a timer, digital compass or a travel sensor to control when images are captured.

In another aspect, the invention includes use of two background displays and two imaging devices, one opposed to each background display. Preferably, each imaging device is mounted on the same support as the background display. This arrangement is designed to provide faster imaging of the vehicle—the images of all sides of the vehicle are completed in ½ a revolution of the backgrounds and imaging devices around the vehicle.

In another aspect, the invention includes use of a flexible enclosure (preferably around all sides and the top, but with an opening for a vehicle to enter) where the interior of the enclosure can include a background display (instead of the background display being on a support). This enclosure can be used with one or more imaging devices.

In a related embodiment using a flexible enclosure, a flexible enclosure can encompass the outside of the supports for the imaging device(s) and the display(s), and cover the otherwise open space above the area between the supports (like a tent over the entire support structures). At least one opening in the flexible enclosure is needed for entry and exit of the vehicle.

Other aspects of the invention are shown in the drawings and described in the Detailed Description below.

3

DETAILED DESCRIPTION

Figure 1:
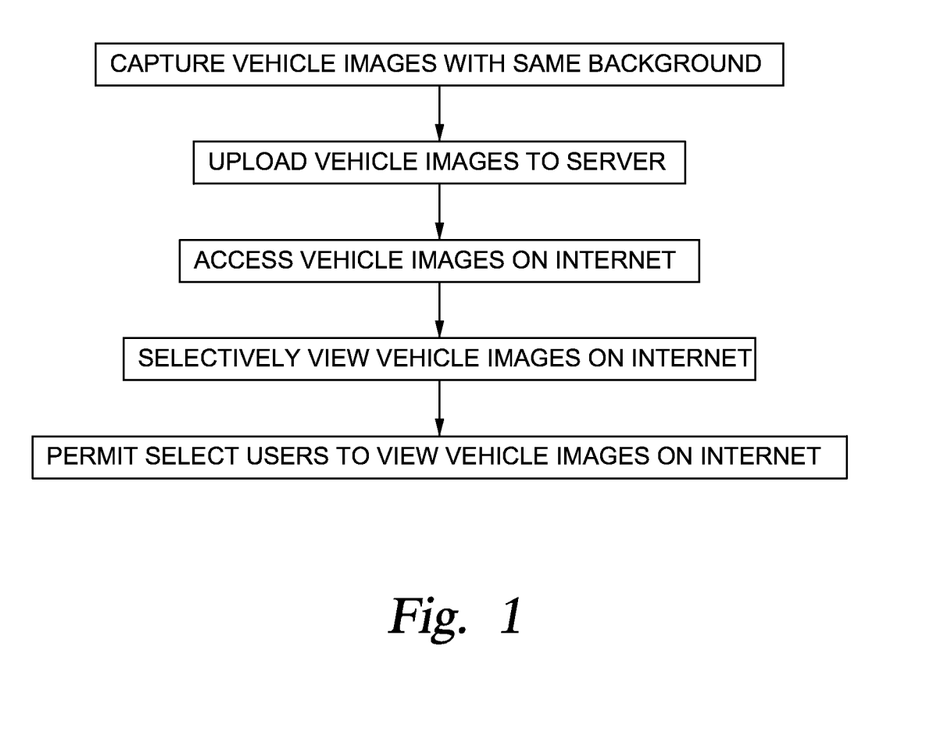
FIG. 1 is a flow diagram showing the capture and viewing of vehicle images as described herein over the internet from a server, without downloading required for viewing.

FIG. 1 is a flow diagram depicting the capture and display of high-resolution images of a vehicle through the internet, where the images have the same background. The image files can be automatically uploaded to a server, after capture, and are retained on the server. Select images and select portions of the high-resolution images can be viewed on the internet, so as not to require excessive bandwidth for viewing, or image downloading from the server to the viewer's computer. FSI Viewer (Neptunelabs Gmbh) provides this type of capture and image display over the internet. Portions of particular images can be selectively zoomed to display them, so that the entirety of all portions of all images is not streamed at the same instant. Other programs to accomplish these ends may also be used.

Figure 9:
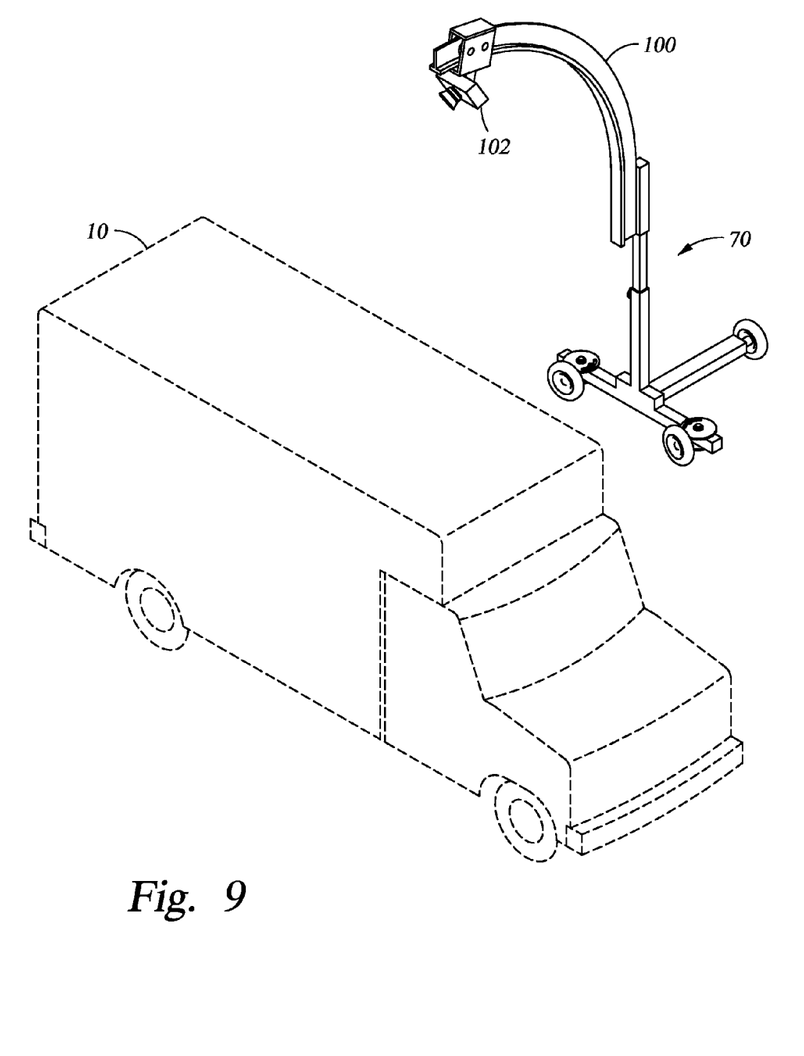
FIG. 9 is an elevational view of an arm with an imaging device attached.

Referring to FIG. 9, an arm 100 is shown arcing above a vehicle 10, where arm 100 has an imaging device 102 positioned to capture images of the uppermost surface of the vehicle. Device 102 can slide along arm 100 to also capture images of the sides of vehicle 10, or device 102 can be fixed to only capture the uppermost vehicle surface, and a separate imaging device (device 33 in FIGS. 2 and 3) can capture the sides of vehicle 10. Device 102 can also be fixed elsewhere (such as to a beam joining carriers 20 and 30) to allow viewing the uppermost part of vehicle 10. The use of device 102 in this manner allows one to generate a simulated three-dimensional view of the vehicle 10, which can be rotated through at least one axis during viewing to show different portions of the exterior surface of the vehicle.

It is possible to view the images directly from the imaging device or from the server, or by downloading the images to a viewer's computer. For wide access for many viewers to the images, and minimizing bandwidth requirements, the arrangement in FIG. 1 is preferred.

Figure 2:
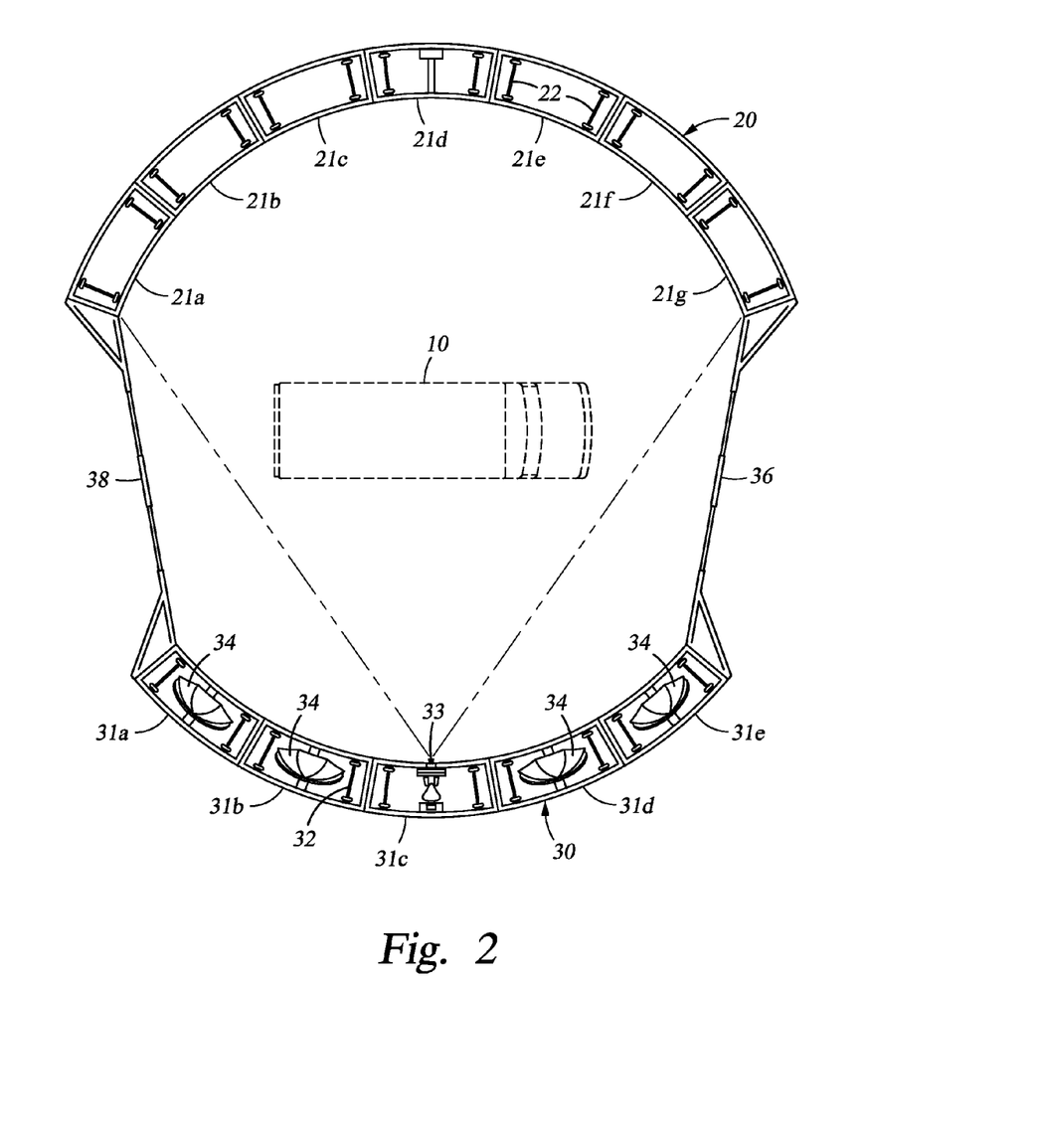
FIG. 2 is a plan view of a vehicle with an arced display carrier and an arced carrier for the imaging device and the lighting.
Figure 3:
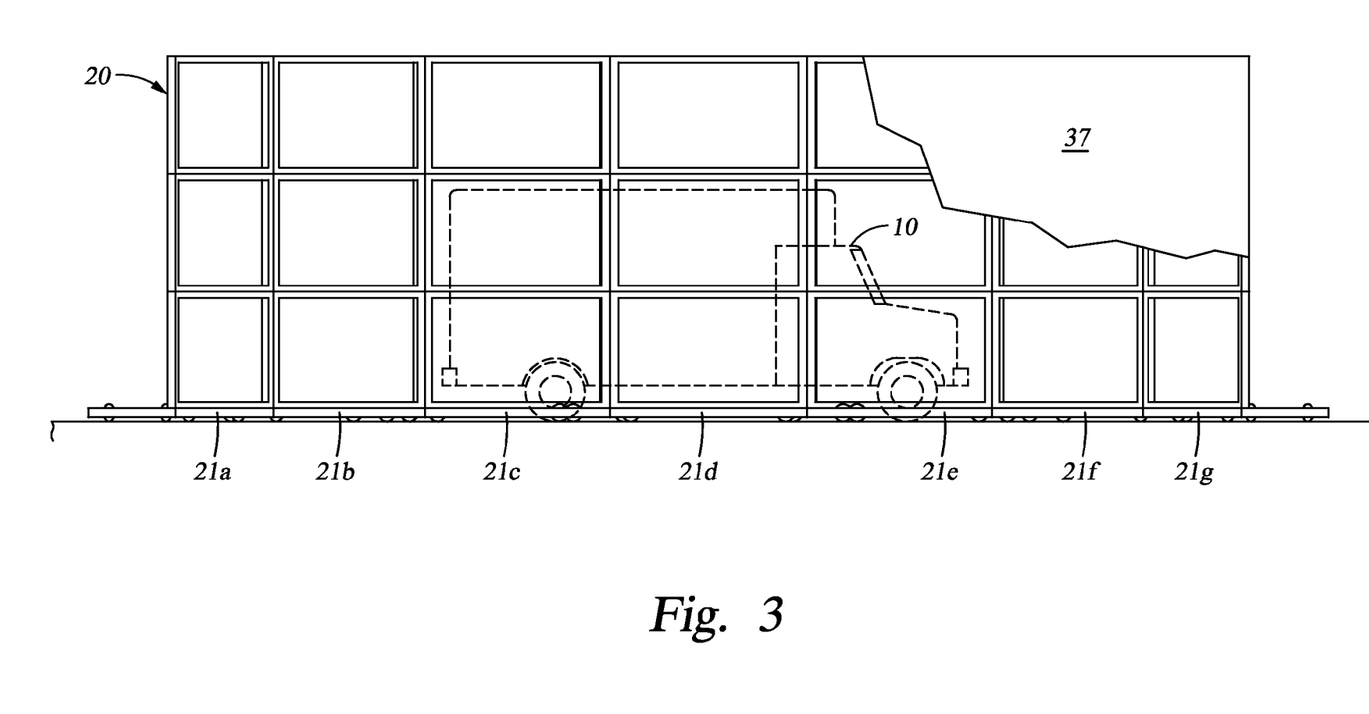
FIG. 3 is an elevational view of a vehicle with the display behind it.
Figure 4:
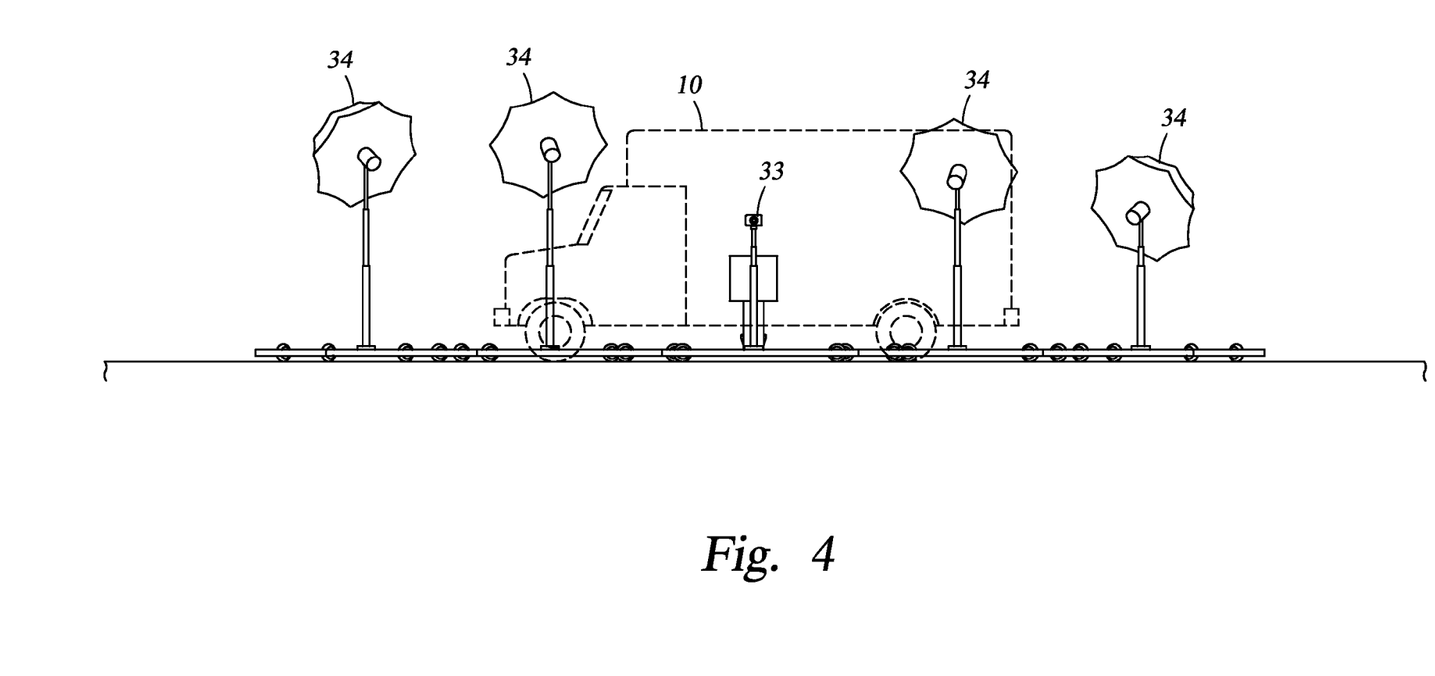
FIG. 4 is an elevational view of a vehicle with the arced carrier of FIG. 2 behind it.

Referring to FIGS. 2 to 4, a vehicle 10 is centered between a background display carrier 20 and a carrier 30. Carrier 30 includes an imaging device 33 and lighting 34. Lighting 34 can be strobe lighting coordinated to be on when each image is captured by device 33, or other lighting. The capture of images can be timed or otherwise controlled to create a series of images showing the entire surface. Another method of controlling image capture is using a digital compass or a travel sensor associated with the carrier 20 or 30, and thereby controlling image capture as the carriers 20 and 30 move a predetermined amount.

Both carriers 20 and 30 consist of several separate sections (21a-21g and 31a-31e, respectively). Having multiple sections makes carriers 20 and 30 more convenient to transport or store, following breaking them down into the sections. More or fewer sections for carriers 20 and 30, or no sections, are also feasible. Each of the sections 21a-21g are equipped with two pairs of wheels 22, on an axle 24, and each of the sections 31a-31e are equipped with two pairs of wheels 32, on an axle 34.

Figure 10:
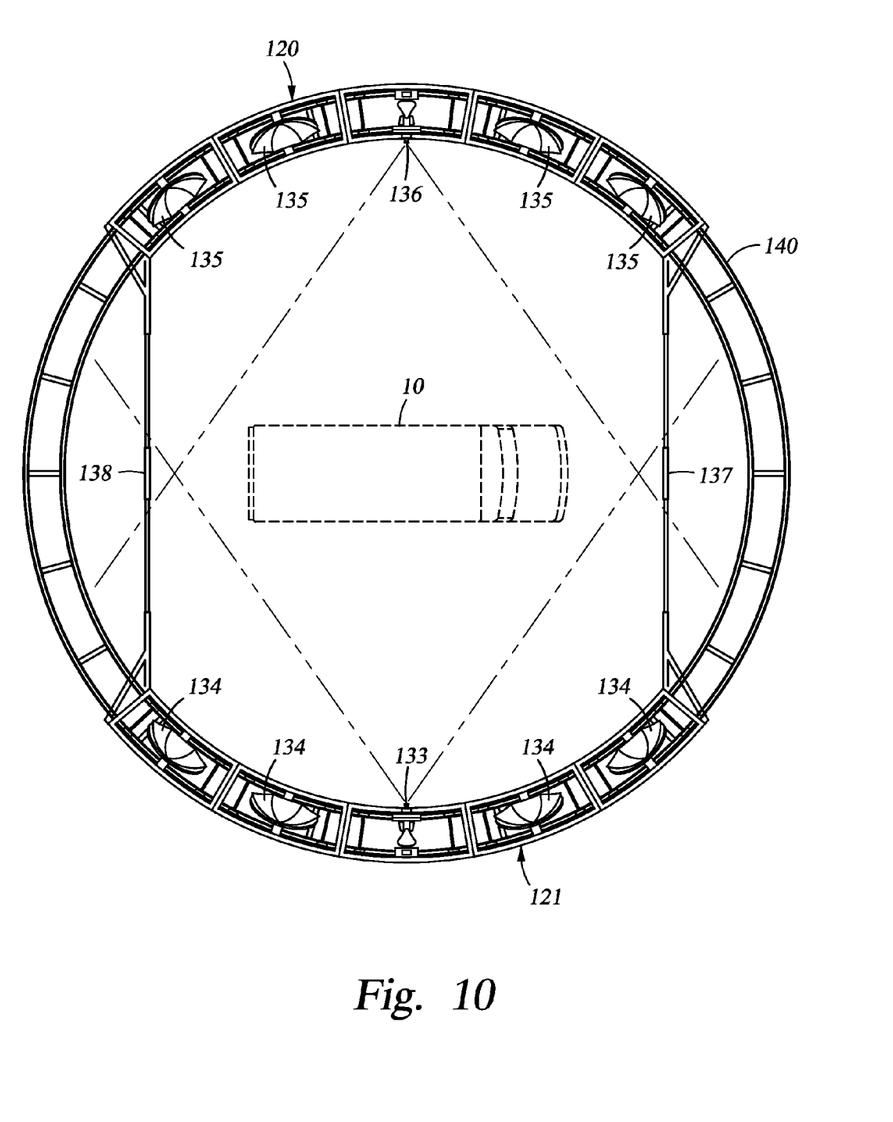
FIG. 10 is a plan view of a vehicle with two arced display carriers, each including lighting and an imaging device, and where the carriers travel on a track.

The wheels 22 and 32 could also ride on a track instead of residing on a surface. Instead of a pair of wheels on an axle, one could substitute a single wheel, either riding on a track or residing on the same surface as the vehicle resides on. A track 140 for accommodating the wheels of a combination carrier and display (described below) is shown in FIG. 10.

The carriers 20 and 30 are arced as shown, and the wheels 22 and 32 would normally be in fixed position with respect to the vertical axis, so that carriers 20 and 30 follow the path their arc's define as they revolve around vehicle 10 on wheels 22 and 32. However, it is possible for the aspect of wheels 22 and 32 to be adjustable so that carriers 20 and 30 can follow different arced paths. If the device employs a single wheel, instead of a pair of wheels on an axle, the aspect of that single wheel can also be altered to control the arc the carriers 20 and 30 follow. Where a track as in FIG. 10 accommodates the wheels, the arc of the track defines the path followed by the carriers 20 and 30.

Arms 36 and 38 link the ends of carriers 20 and 30, so that they revolve together. In one embodiment, arms 36 and 38 should provide enough clearance to permit vehicle 10 to move in and out from its position between carriers 20 and 30. Other methods of linking carriers 20 and 30 include having arms 36 and 38 hinged (to swing horizontally) or removable (see FIGS. 11 and 12). Any such foregoing arrangement of arms 36 and 38 would allow the arms 36 and 38 to be moved out of the way when a vehicle is to enter or exit the imaging area. Carriers 20 and 30 could also be linked with other arrangements, including by connecting them to one beam which is affixed to the ceiling. Or wheels 22 and 32 of, respectively, carriers 20 and 30 could be separately powered, provided their movement is coordinated—for example, by shining electronic beams from one support to a receptor on the opposing support.

Figure 3A:
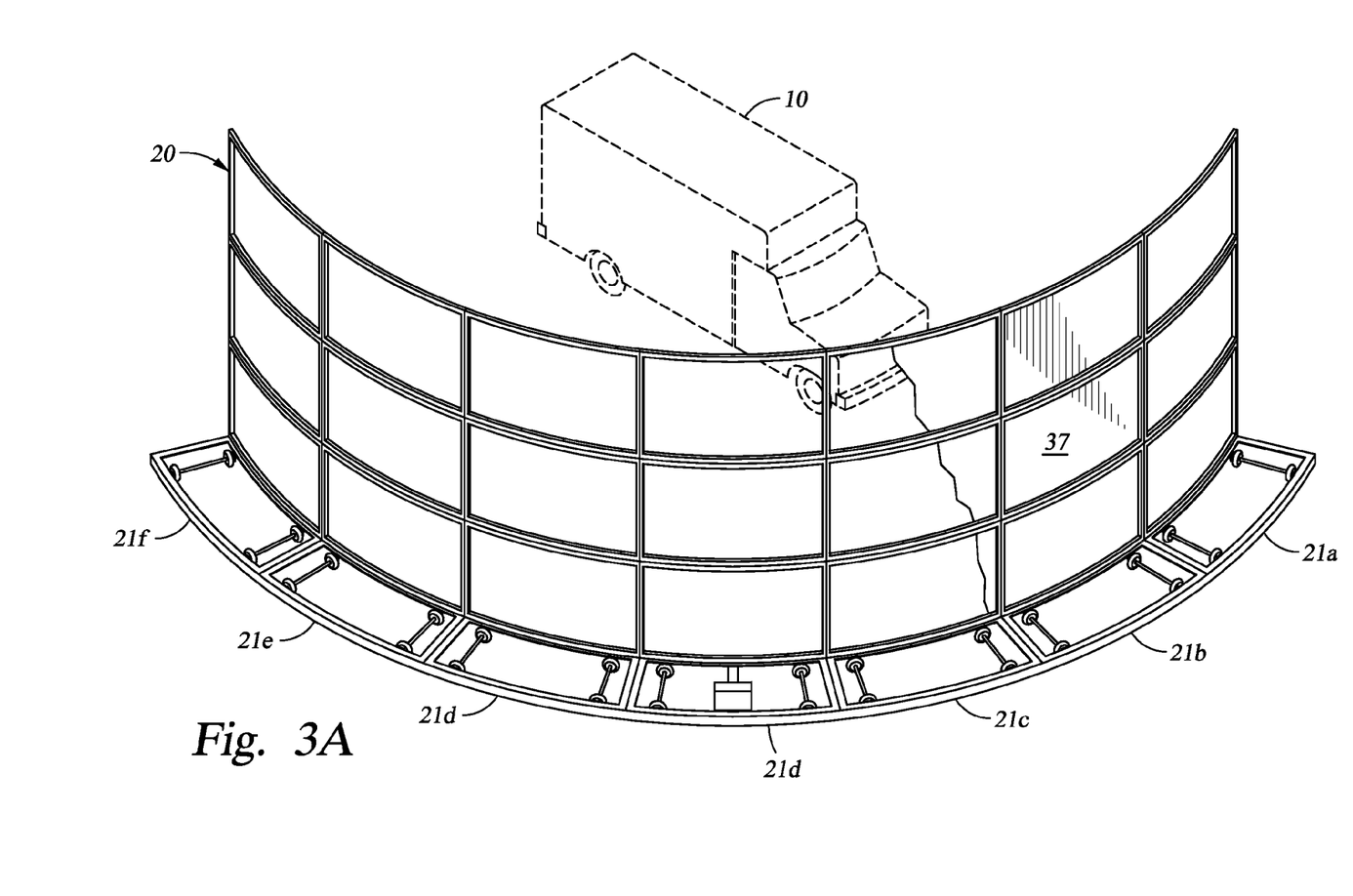
FIG. 3A is an elevational view depicting a transparent display with the truck behind it, and a screen on the upper portion of the display.

In FIGS. 3 and 3A a screen 37 is shown partially in place over the vehicle 10 side of carrier 20. When screen 37 is fully lowered, it displays a desirable background for the vehicle 10 when its images are captured by imaging device 33. The background on the screen 37 can be any type, including a green screen.

Figure 5:
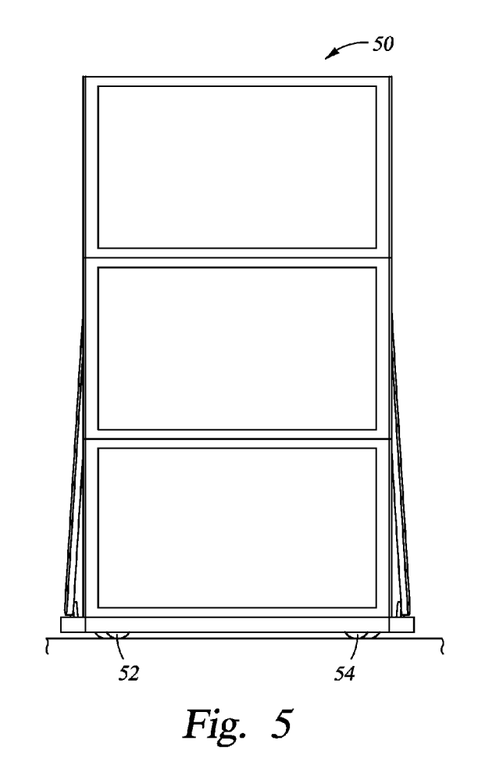
FIG. 5 is an elevational view of a display carrier with wheel direction adjustable to direct the display carrier through different arcs.
Figure 5A:
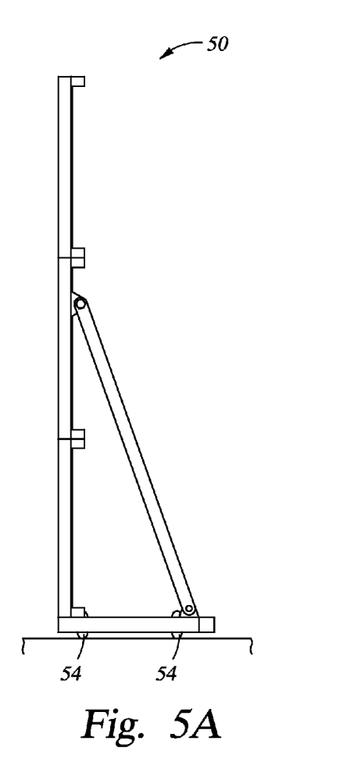
FIG. 5A is a side view of the display carrier of FIG. 5, showing the support for the display and the direction adjustment for the wheels.
Figure 6:
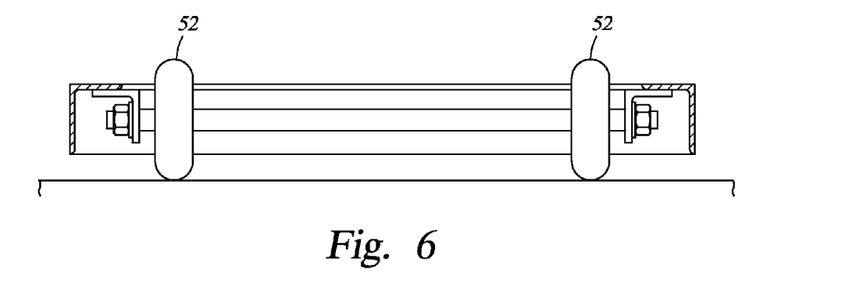
FIG. 6 is an enlarged view of the view of the wheels and axle of FIG. 5A.

FIGS. 5 and 5A are respectively plan and side views of a carrier 50 having a first set of wheels 52 and a second set of wheels 54. At least one of the sets of wheels 52 or 54 can be rotated with respect to the vertical axis (as shown for wheels 52 in FIG. 6) to allow the carrier 50 to move on a variety of arced paths. Carrier 50 is a representation of one section of carrier 20, such as section 21g as shown in FIG. 3.

Figure 7:
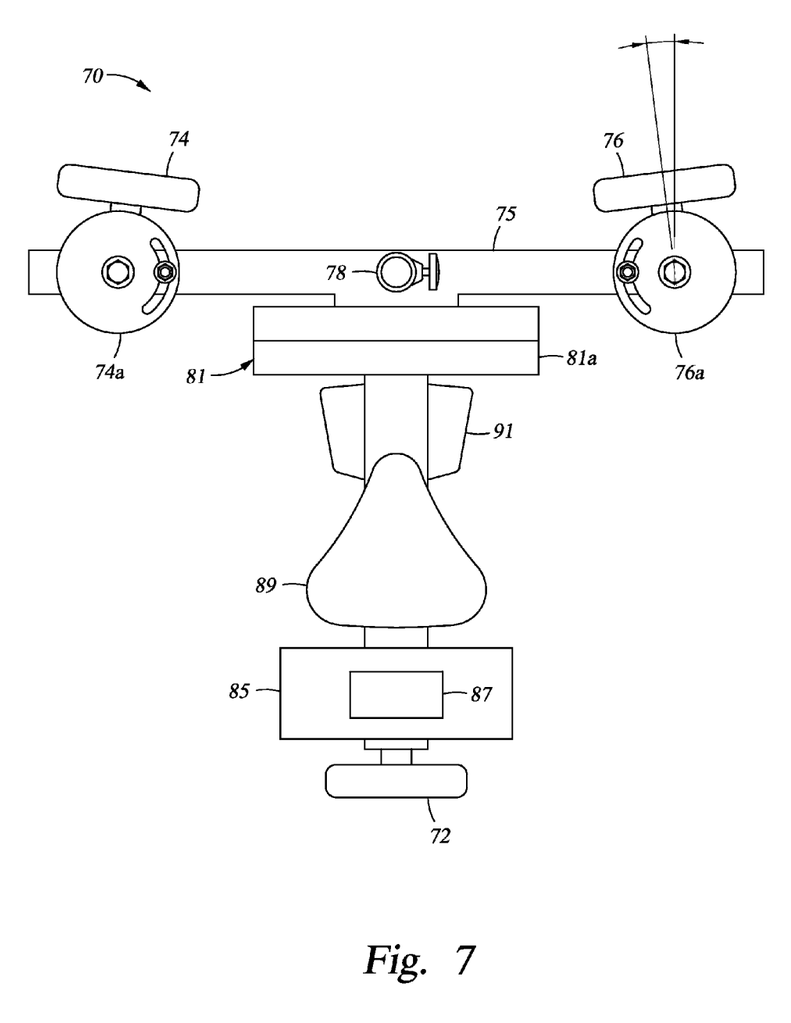
FIG. 7 is a plan view of a motorized wheeled dolly (where the wheels control direction) for carrying an operator, an imaging device (on a tripod), a computer, lighting and other components.
Figure 8:
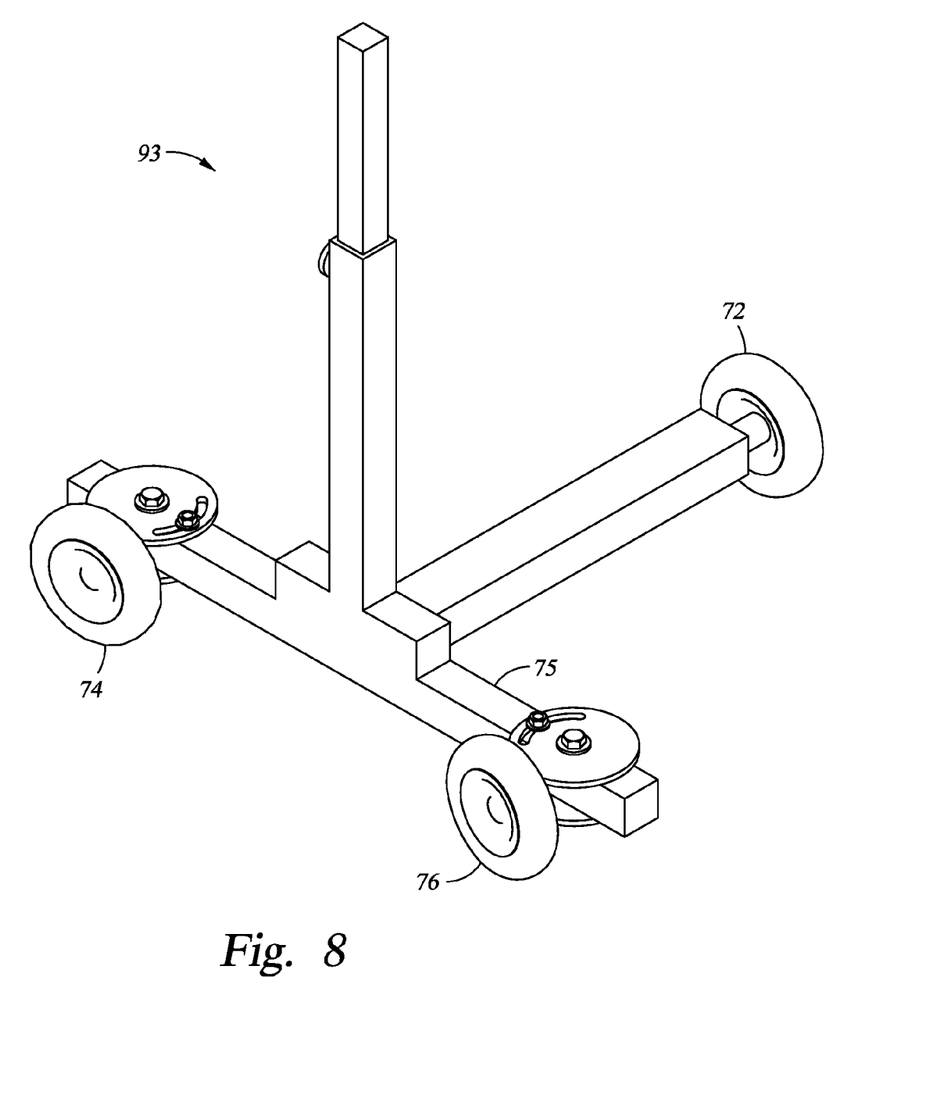
FIG. 8 is an elevational view of the chassis and wheels of the dolly of FIG. 7.

In FIG. 7, dolly 70 has three wheels 72, 74 and 76, a tripod docking station 78 (where an adjustable imaging device docking station can be attached to the tripod). Wheels 74 and 76 can be rotated to the other side of support 75 by rotating plates 74a and 76a through ½ turn, so that dolly 70 can follow an arc in either direction. FIG. 7 shows a computer docking station 81 for a computer, and a motor 85 or other drive unit. Batteries 87 are shown as well. Computer 81a can upload images from device 33 or 102, automatically or under operator control, from where the images can be viewed or transferred to a server. It also shows a seat 89 for an operator, and foot pegs 91. FIG. 8 shows a telescoping tripod 93, to which an imaging device can be affixed. The imaging device can be attached with a movable mount, so it can shoot at a variety of angles.

Motor 85 can drive the wheel 72 in either direction to cause revolution of the dolly 70 about the vehicle (vehicle 10 in FIGS. 2 to 4) in either direction. Dolly 70 can be linked to carrier 50, or carrier 50 can be independent and have its own motor and movement control. In the case where dolly 70 and carrier 50 have their own motors, their relative positions to each other and to the vehicle being imaged could be maintained using electronic beams and receptors on dolly 70 and carrier 50, which control the motors to maintain the beams and receptors in alignment. One could also use other methods of movement control i.e., a digital compass 23a or a travel sensor.

Motor 85 or other motors on carrier 50 or dolly 70 can be electric, gas or diesel, and the dolly 70 can include a position to carry the energy source for motor 87, including a photovoltaic cell or batteries 87.

FIG. 9 shows an arm 100 for carrying an imaging device which can capture the upper surfaces of vehicle 10. The imaging device 102 can slide up and down along arm 100 and also be locked into position along the sliding arc. Arm 100 would be attached to dolly 70 or the carriers 20 or 30.

FIG. 10 depicts carriers 120 and 121 which each include a background display (arranged on the inside of the carriers surfaces, like display 37 in FIGS. 3 and 3A), an imaging device 133 or 136, and lights 134 or 135. In this embodiment, preferably, each imaging device 133 captures images in alternating sequence as the carriers 120 and 121 revolve around vehicle 10, and each opposing set of lights alternates off and on, and is off when the opposing imaging device is capturing images, and on when the imaging device on its carrier is active. So in FIG. 10, lights 134 are on when device 133 captures images, and off when device 136 captures images. This allows the correct set of lights to illuminate the side of vehicle 10 when it is being imaged and prevents interference with the image from it capturing light from the opposing set of lights. In FIG. 10, arms 137 and 138 connect carriers 120 and 121.

A variation of the embodiment shown in FIG. 10 is to have carriers 120 and 120 joined by a wall (not shown), so as to form a substantially contiguous cylinder, but with an entrance for a vehicle somewhere in the contiguous wall structure. This embodiment could use one, two or more imaging devices which rotate with the wall structure. The lighting with multiple cameras would be similar to the arrangements as described and shown for FIG. 10 if multiple cameras are deployed.

The problem of interference from opposing lights could also be solved by positioning of the lights relative to the imaging devices. If the lights are positioned high, as shown for lights 34 in FIG. 4, and the imaging device is positioned in a lower plane, even if the lights stay on, they should not create much interference, as the imaging devices will not be directly pointing at them. To avoid having the opposing imaging device appear in the images, the position of the devices can be adjusted—for example, by moving the devices to opposite ends of the carriers for them.

Figure 11:
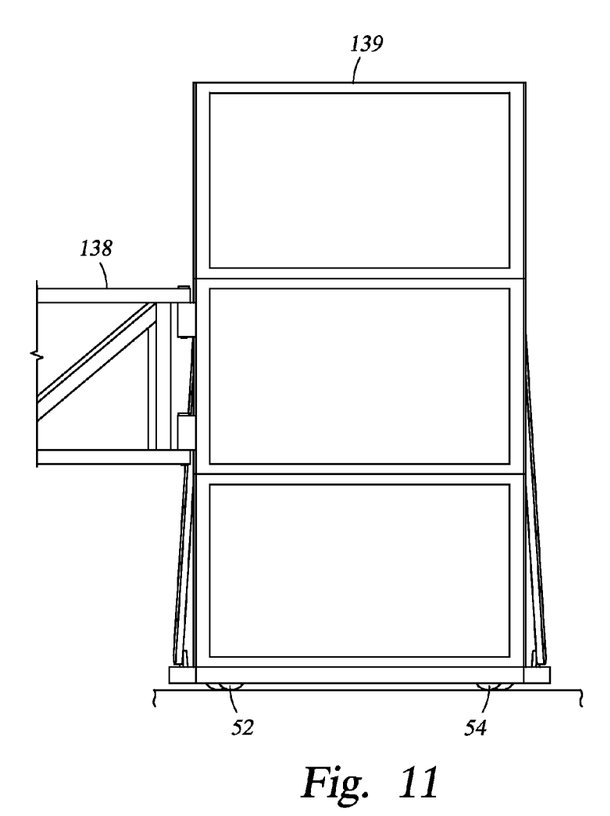
FIG. 11 shows arm 36 connected with a hinge to a display section.
Figure 12:
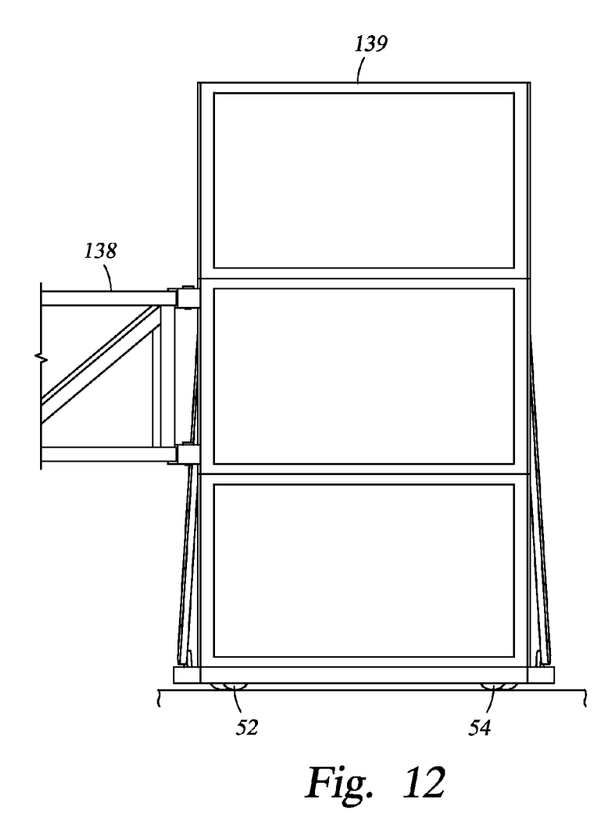
FIG. 12 shows arm 36 removably connected to a display section.

FIG. 11 shows arm 138 connected with a hinge to an end section 139 of carrier 120. FIG. 12 shows an arm 138 removably connected to an end section 139 of carrier 120. Either arrangement allows the arm 138 to be removed so that the vehicle 10 (not shown) can be placed into position for imaging, between the displays. Both arms 137 and 138, or either arm, could be removable or hinged. The removable or hinged arm arrangement in FIGS. 11 and 12 can be used with a dual imaging device arrangement (FIG. 10), or when only imaging device is used.

Figure 13:
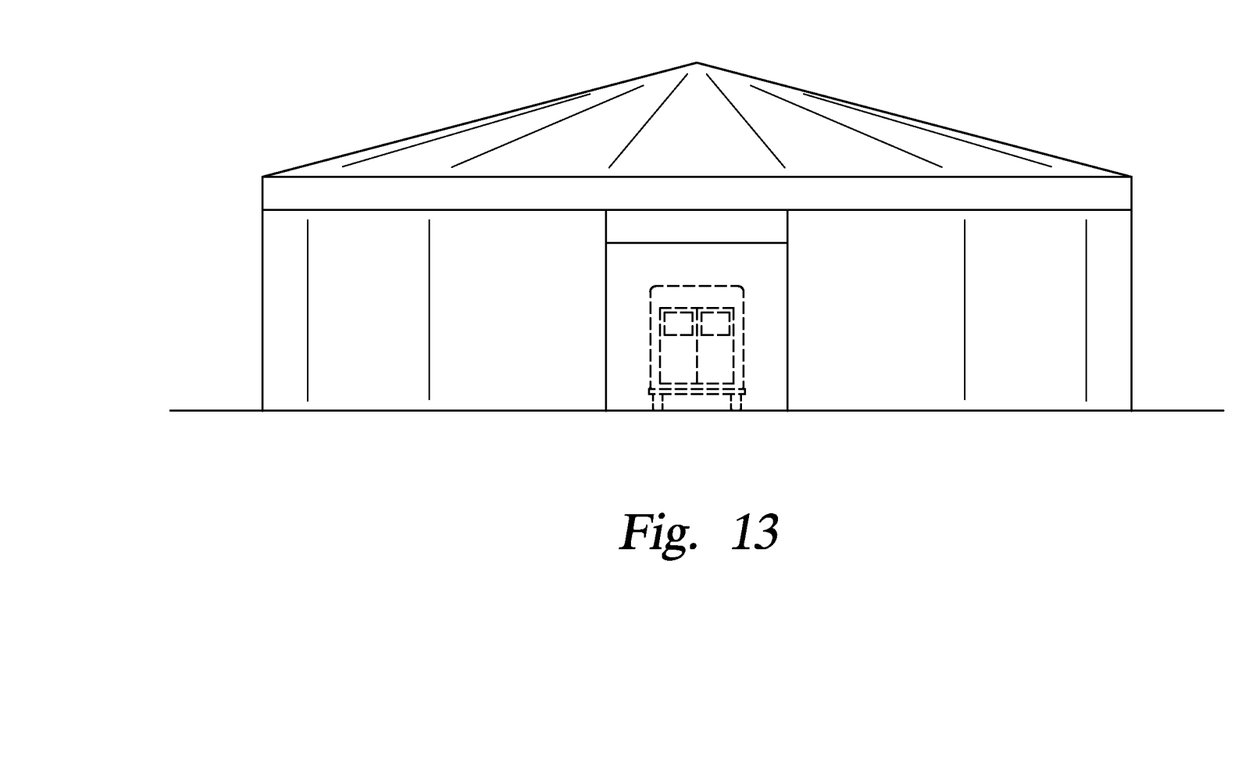
FIG. 13 shows a flexible enclosure for the imaging system.
Figure 14:
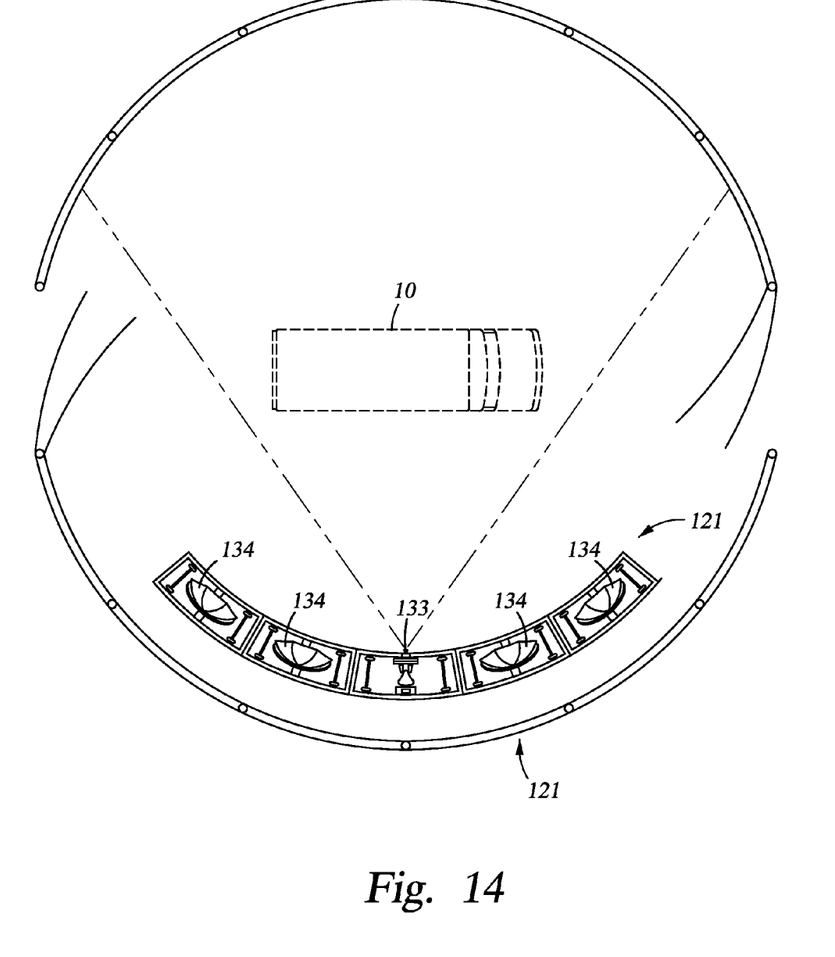
FIG. 14 depicts a background display on the interior of the wall portion of the flexible enclosure.

The entire imaging system and the vehicle as described herein could be enclosed in a structure (not shown), such as a tent, building or dome. The material the tent is made from could be polymer or canvas or other flexible material. The structure would need to accommodate the entry and exit of vehicles and personnel, so it would typically have a large entrance doorway (or flap), or an open section, large enough to allow vehicle entry and exit. A tent-like structure is shown in FIG. 13. In one embodiment, the interior walls of the structure have the background display imprinted on them, thereby eliminating the need for a display carrier. The structure should have a roof to block ambient light (as well as rain and snow) and keep the image quality consistent.

It should be understood that the terms and expressions used herein are exemplary only and not limiting, and that the scope of the invention is defined only in the claims which follow, and includes all equivalents of the subject matter of the claims.

What is claimed is:

1. An apparatus for producing images of the commonly viewed exterior surfaces of a vehicle, while maintaining the same background view for multiple images of the vehicle, comprising:

an imaging device mounted on a first support having wheels, and a display on one surface of a second support having wheels, where the first and second supports are opposed and physically linked by arms which run between and join the first and second supports together such that the first support and the second support can revolve around the vehicle which is positioned between them, while maintaining their positions relative to each other and to the vehicle;

the wheels of the first and second supports and the wheels of the vehicle all reside in a supporting plane;

the arms are either positioned high enough relative to the supporting plane such that the vehicle can pass freely underneath the arms or, the arms can be moved out of the way of removed to allow the vehicle to be positioned; and the imaging device captures multiple images of the vehicle during each revolution, and the display is also captured in each of said images, and wherein the images are sufficiently pixilated such that damage to the vehicle exterior surface can be viewed when the images are displayed.

2. The apparatus of claim 1 wherein the wheels on the first and/or the second support rotate on an axis such that the arc the display and the imaging device follow during revolution can be altered.

3. The apparatus of claim 1 wherein one of the arms includes an extension projecting downwardly, and the extension is designed to have the imaging device mounted thereon.

4. The apparatus of claim 1 wherein a digital compass or a travel sensor control when images are captured.

5. The apparatus of claim 1 wherein a support structure carrying lights is mounted on the first support.

6. The apparatus of claim 5 wherein the lights face and illuminate the vehicle.

7. The apparatus of claim 5 wherein the lights are strobe lights which are on when the imaging device captures images.

8. The apparatus of claim 1 wherein a support structure mounted on the first support includes an adjustable mount for the imaging device permitting the portions of the vehicle imaged to be altered.

9. The apparatus of claim 1 wherein a support structure mounted on the first support includes an attachment for at least one additional imaging device designed to capture images of the uppermost surface of the vehicle.

10. The apparatus of claim 1 wherein the display includes the background view on the side thereof facing the imaging device.

11. The apparatus of claim 10 wherein the background view is a green screen.

12. The apparatus of claim 10 wherein the display is curved such that the imaging device captures a concave portion of the display.

13. The apparatus of claim 1 wherein the first support and/or the second support are curved.

14. An apparatus for producing images of the commonly viewed exterior surfaces of a vehicle, while maintaining the same background view for multiple images of the vehicle, comprising:
  an imaging device mounted on a first support having wheels, and a display on one surface of a second support having wheels, where the first and second supports are opposed and physically linked by arms which run between and join the first and second supports together such that the first support and the second support can revolve around the vehicle which is positioned between them, while maintaining their positions relative to each other and to the vehicle;
  the wheels of the first and second supports roll on a track resting on a supporting plane and the wheels of the vehicle also rest on the supporting plane;
  the arms are either positioned high enough relative to the supporting plane such that the vehicle can pass freely underneath the arms or, the arms can be moved out of the way of removed to allow the vehicle to be positioned; and
  the imaging device captures multiple images of the vehicle during each revolution, and the display is also captured in each of said images, and wherein the images are sufficiently pixilated such that damage to the vehicle exterior surface can be viewed when the images are displayed.

15. The apparatus of claim 14 wherein the first and second supports have sets of wheels with each set mounted on opposing ends of an axle, or have a row of wheels which are aligned with the direction of travel of the respective first and second supports.

16. The apparatus of claim 14 wherein the row of wheels reside on a single track, which is arced.

17. An apparatus for producing images of the commonly viewed exterior surfaces of a vehicle, while maintaining the same background view for multiple images of the vehicle, comprising:
  at least two imaging devices, one of which is mounted on a first support having wheels, and the other mounted on a second support having wheels;
  at least two displays, one of which is on one surface of the first support and the other is on an opposing surface of the second support, where the first and second supports are opposed and physically linked by arms which run between and join the first and second supports together such that the first support and the second support can revolve around the vehicle which is positioned between them, while maintaining their positions relative to each other and to the vehicle;
  the wheels of the first and second supports and the wheels of the vehicle all reside in a supporting plane;
  the arms are either positioned high enough relative to the supporting plane such that the vehicle can pass freely underneath the arms or, the arms can be moved out of the way of removed to allow the vehicle to be positioned; and
  the imaging devices capture multiple images of the vehicle during each revolution, and the opposing displays are also captured in each of said images, and wherein the images are sufficiently pixilated such that damage to the vehicle exterior surface can be viewed when the images are displayed.

18. The apparatus of claim 17 wherein the first and second supports have sets of wheels with each set mounted on opposing ends of an axle, or have a row of wheels which are aligned with the direction of travel of the respective first and second supports.

19. The apparatus of claim 17 wherein the row of wheels reside on a single track, which is arced.

20. The apparatus of claim 17 wherein at least one light for illuminating the vehicle is mounted on each of the first and second supports.

21. The apparatus of claim 20 wherein the lights are strobe lights.

* * * * *

UNITED STATES PATENT AND TRADEMARK OFFICE
CERTIFICATE OF CORRECTION

PATENT NO. : 9,438,864 B2
APPLICATION NO. : 14/478681
DATED : September 6, 2016
INVENTOR(S) : Stephen M. Swinford It is certified that error appears in the above-identified patent and that said Letters Patent is hereby corrected as shown below:

In the Claims

Column 6, Lines 38-63, should read:
1. An apparatus for producing images of the commonly viewed exterior surfaces of a vehicle, while maintaining the same background view for multiple images of the vehicle, comprising: an imaging device mounted on a first support having wheels, and a display on one surface of a second support having wheels, where the first and second supports are opposed and physically linked by arms which run between and join the first and second supports together such that the first support and the second support can revolve around the vehicle which is positioned between them, while maintaining their positions relative to each other and to the vehicle; the wheels of the first and second supports and the wheels of the vehicle all reside in a supporting plane; the arms are either positioned high enough relative to the supporting plane such that the vehicle can pass freely underneath the arms or, the arms can be moved out of the way or removed to allow the vehicle to be positioned; and the imaging device captures multiple images of the vehicle during each revolution, and the display is also captured in each of said images, and wherein the images are sufficiently pixilated such that damage to the vehicle exterior surface can be viewed when the images are displayed.

Column 7, Lines 32-Column 8, Lines 1-3, should read:
14. An apparatus for producing images of the commonly viewed exterior surfaces of a vehicle, while maintaining the same background view for multiple images of the vehicle, comprising: an imaging device mounted on a first support having wheels, and a display on one surface of a second support having wheels, where the first and second supports are opposed and physically linked by arms which run between and join the first and second supports together such that the first support and the second support can revolve around the vehicle which is positioned between them, while maintaining their positions relative to each other and to the vehicle; the wheels of the first and second supports roll on a track resting on a supporting plane and the Signed and Sealed this
First Day of March, 2022

Drew Hirshfeld
*Performing the Functions and Duties of the*
*Under Secretary of Commerce for Intellectual Property and*
*Director of the United States Patent and Trademark Office* wheels of the vehicle also rest on the supporting plane; the arms are either positioned high enough relative to the supporting plane such that the vehicle can pass freely underneath the arms or, the arms can be moved out of the way or removed to allow the vehicle to be positioned; and the imaging device captures multiple images of the vehicle during each revolution, and the display is also captured in each of said images, and wherein the images are sufficiently pixilated such that damage to the vehicle exterior surface can be viewed when the images are displayed.

Column 8, Lines 11-39, should read:
17. An apparatus for producing images of the commonly viewed exterior surfaces of a vehicle, while maintaining the same background view for multiple images of the vehicle, comprising: at least two imaging devices, one of which is mounted on a first support having wheels, and the other mounted on a second support having wheels; at least two displays, one of which is on one surface of the first support and the other is on an opposing surface of the second support, where the first and second supports are opposed and physically linked by arms which run between and join the first and second supports together such that the first support and the second support can revolve around the vehicle which is positioned between them, while maintaining their positions relative to each other and to the vehicle; the wheels of the first and second supports and the wheels of the vehicle all reside in a supporting plane; the arms are either positioned high enough relative to the supporting plane such that the vehicle can pass freely underneath the arms or, the arms can be moved out of the way or removed to allow the vehicle to be positioned; and the imaging devices capture multiple images of the vehicle during each revolution, and the opposing displays are also captured in each of said images, and wherein the images are sufficiently pixilated such that damage to the vehicle exterior surface can be viewed when the images are displayed.